A. P. HOLDEN & R. J. COPELAND.
AIR VENDING MACHINE.
APPLICATION FILED JUNE 6, 1912.

1,156,078.

Patented Oct. 12, 1915.
8 SHEETS—SHEET 1.

A. P. HOLDEN & R. J. COPELAND.
AIR VENDING MACHINE.
APPLICATION FILED JUNE 6, 1912.

1,156,078.

Patented Oct. 12, 1915.
8 SHEETS—SHEET 5.

Fig. 4.

Witnesses.
L. Chewright
E. Bernstein

Inventors.
Arthur P. Holden
Robert J. Copeland
by Chas H Riches
Attorney

A. P. HOLDEN & R. J. COPELAND.
AIR VENDING MACHINE.
APPLICATION FILED JUNE 6, 1912.

1,156,078.

Patented Oct. 12, 1915.
8 SHEETS—SHEET 6.

UNITED STATES PATENT OFFICE.

ARTHUR PEART HOLDEN AND ROBERT JAMES COPELAND, OF TORONTO, ONTARIO, CANADA.

AIR-VENDING MACHINE.

1,156,078.   Specification of Letters Patent.   Patented Oct. 12, 1915.

Application filed June 6, 1912. Serial No. 702,122.

*To all whom it may concern:*

Be it known that we, ARTHUR PEART HOLDEN and ROBERT JAMES COPELAND, of the city of Toronto, in the county of York and Province of Ontario, Canada, have invented certain new and useful Improvements in Air-Vending Machines; and we hereby declare that the following is a full, clear, and exact description of the same.

The object of our invention is to devise an air vending apparatus comprising three principal integers, namely:—(a) a coin controlled mechanism operable when a coin has been introduced into the apparatus; (b) an air compressor operable when the coin controlled mechanism has been actuated; and (c) means to automatically stop the operation of the air compressor when the air compressed thereby has attained a pre-determined pressure.

When the apparatus is used for the inflation of pneumatic tires and the like, the air may be delivered direct from the air compressor into the air tube the pumping of the air being continued until the air attains a pre-determined pressure therein, when through the agency of the stopping means which may be connected either with the air compressor itself or with the air ducts leading from the air compressor to the place of delivery, the operation of the air compressor is automatically and instantaneously stopped.

When the apparatus is employed for the pumping of compressed air into a storage tank for subsequent use, the operation of the air compressor is continued until the compressed air therein has attained a predetermined pressure, when, through the operation of the stopping mechanism influenced by the air pressure, the operation of the air compressor is automatically and instantaneously stopped.

For an understanding of the invention and how it may be carried into practice, reference is to be had to the following description and to the accompanying drawings, in which:—

Fig. 2ª, is a similar view to Fig. 2, showing a machine suitable for the inflation of pneumatic tires.

According to our invention, the coin $f'$ is introduced into the machine through a coin slot $a$, in the cover plate $b$, and when so introduced, it passes into the coin pocket $l^5$ of the coin carriage $c$, to be conveyed by the coin carriage to the coin chute $d$.

Figure 3:
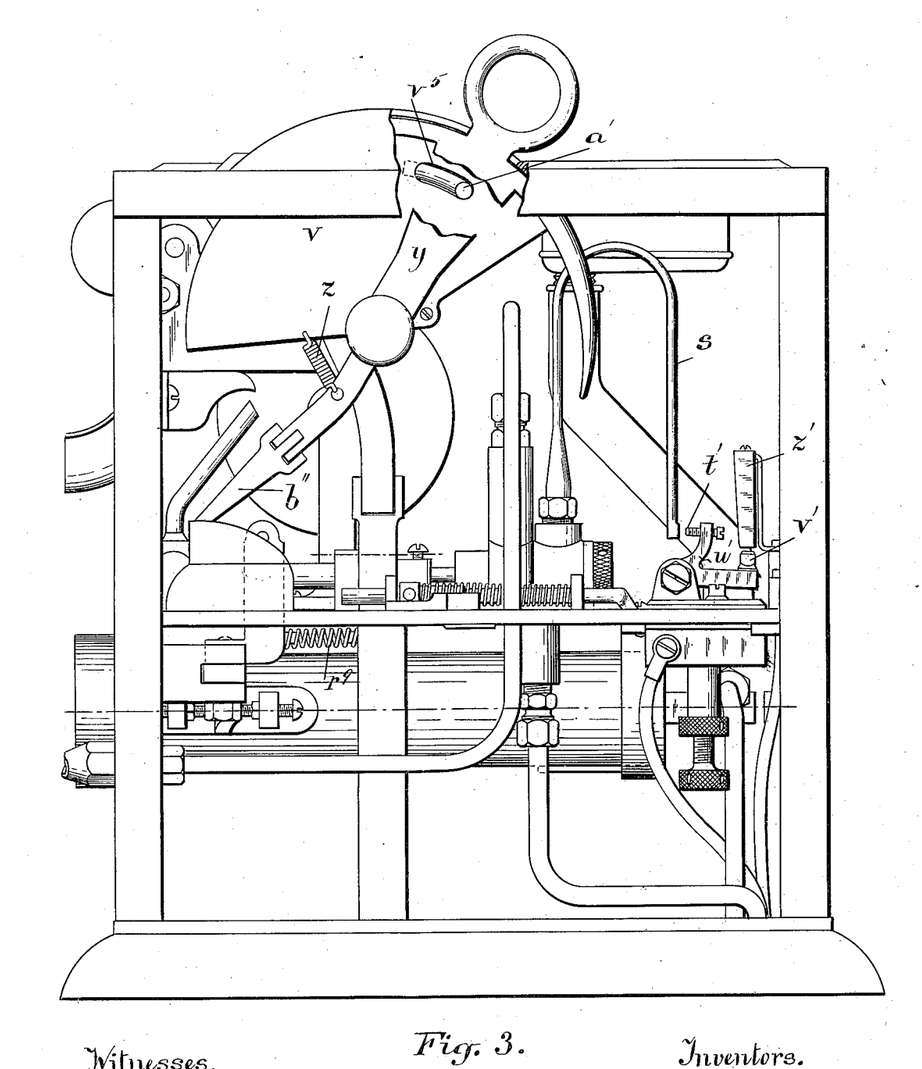
Fig. 3, is a broken side elevation of the coin controlled mechanism shown in Fig. 2, with the parts in their normal position.
Figure 4:
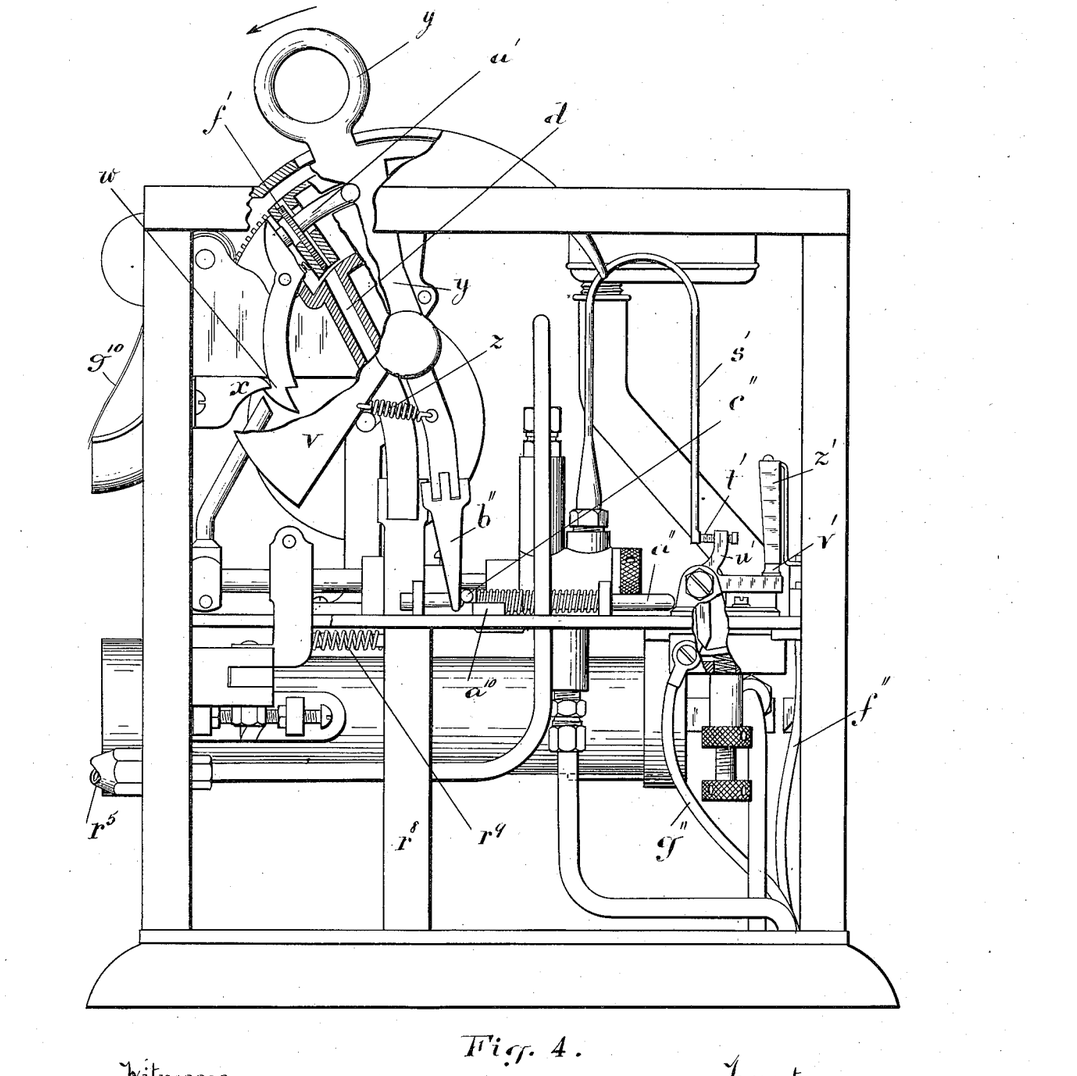
Fig. 4, is a sectional elevational view of the coin controlled mechanism with the parts in their operated position.
Figure 5:
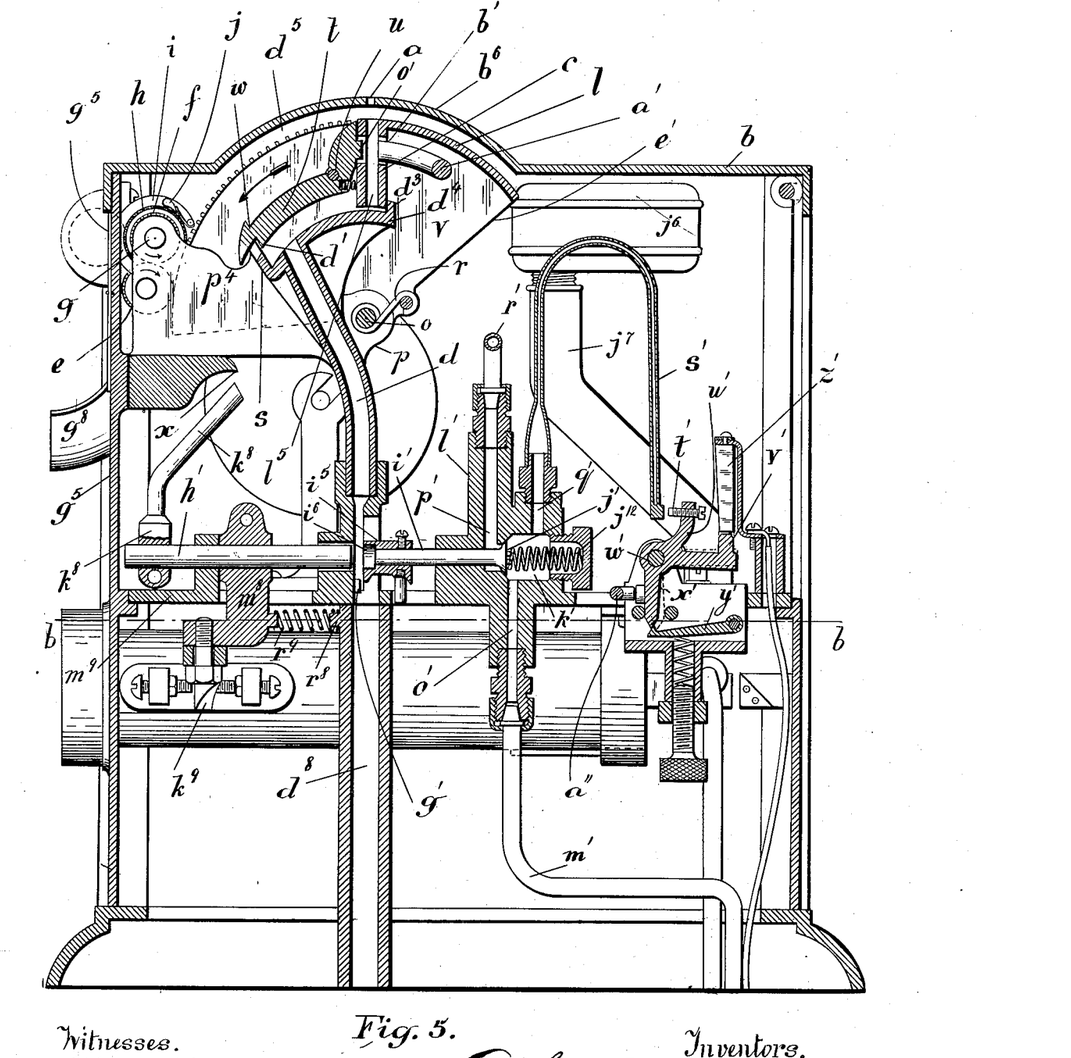
Fig. 5, is a vertical sectional view of the coin controlled mechanism on the line $a$—$a$ Fig. 1.
Figures 6, 7, 8, 9:
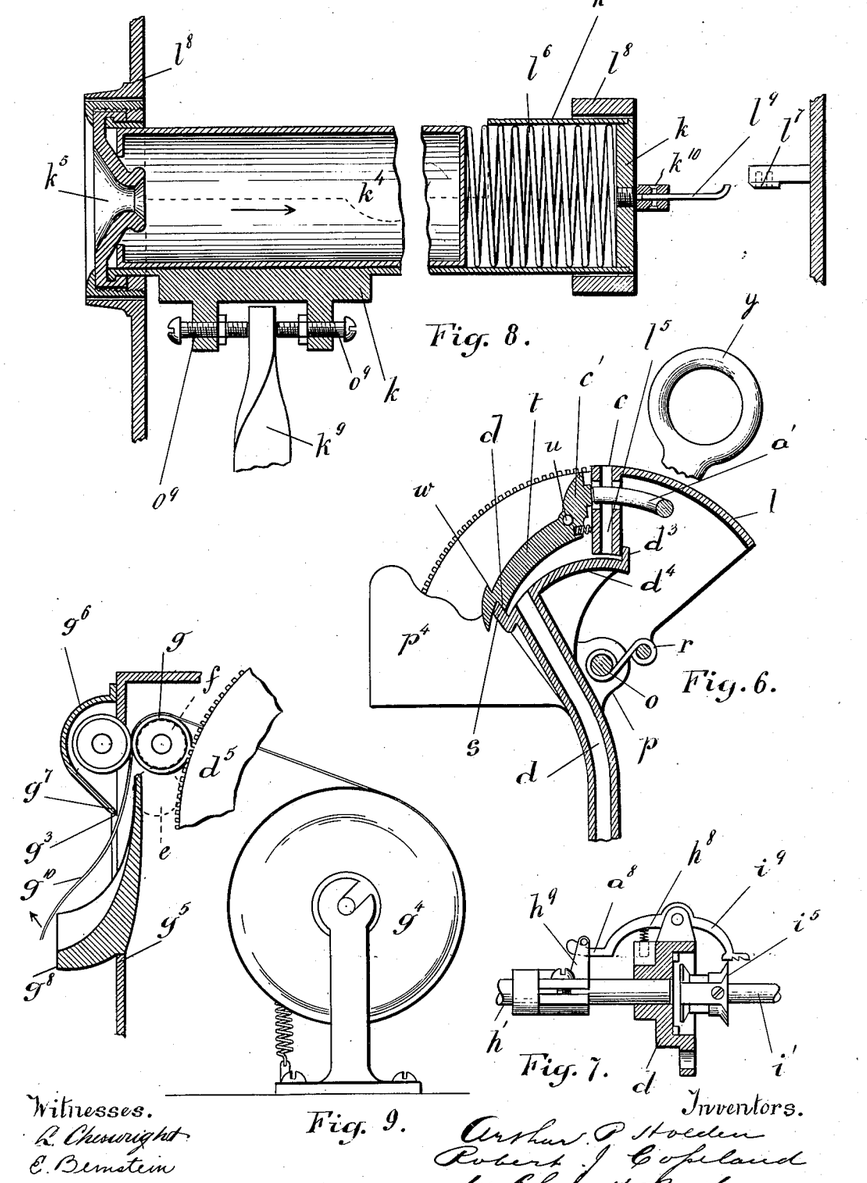
Fig. 6, is a sectional view of the coin carriage and coin chute showing the coin carriage locked at its normal position.
Fig. 7, is a sectional view showing the detent for temporarily locking the air valve in its open position.
Fig. 8, is a horizontal section through the nicotin carriage and receptacle.
Fig. 9, is a sectional elevation of the paper feeding mechanism.
Figure 11:
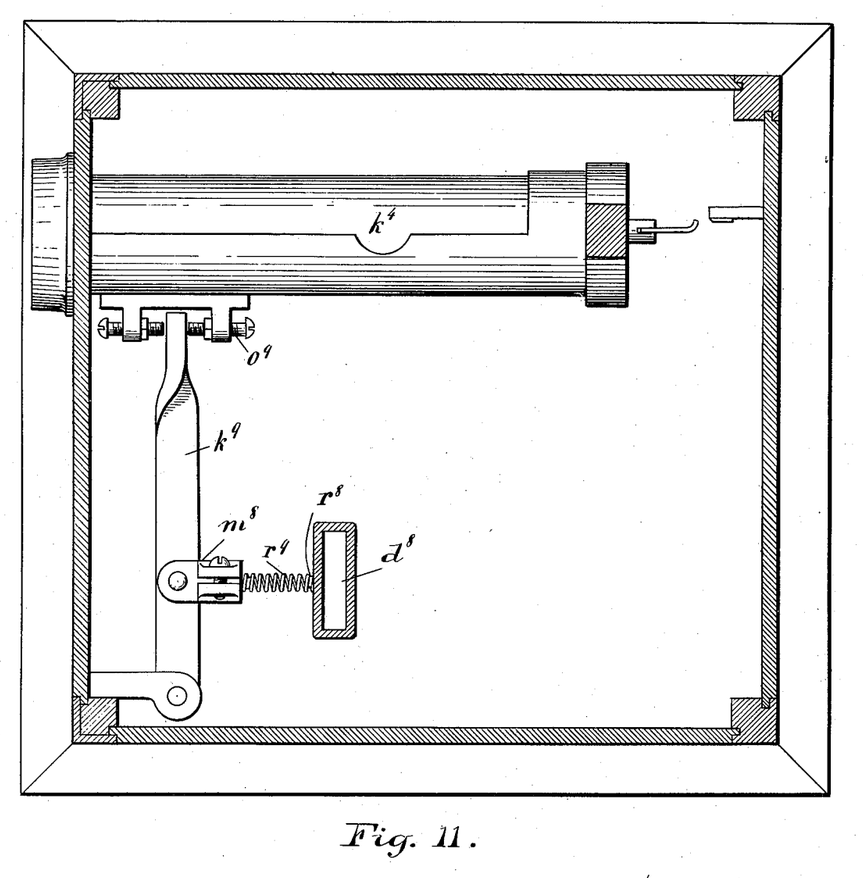

The coin carriage $c$ is provided with side plates $v$, through which passes a shaft $o$ journaled in lugs $p$, forming part of the coin chute $d$; and tensioning the coin carriage are springs $r$, connected to the shaft $o$, and side plates $v$; the side plates $v$ being loosely mounted on the shaft $o$, so that the coin carriage can rock from the position shown in Figs. 3, 5 and 6, to that shown in Fig. 4.

The normal position of the coin carriage is that shown in Fig. 5, and in this position, the coin pocket $l^5$ is directly below and in line with the coin slot $a$, so that the coin can then pass through the coin slot into the coin pocket.

The descent of the coin from the coin pocket $l^5$ before the movement of the coin carriage from the position shown in Figs. 3, 5 and 6, is prevented by a curved flange $d^4$, extending rearwardly from the top of the coin chute $d$, this curved flange forming a bottom for the coin pocket until the latter comes into line with the coin chute $d$. At the end of the curved flange $d^4$, is an offset $d^3$ engaging the outer surface of the coin carriage $c$ and arresting it when it comes to a normal position, as shown in Figs. 3, 5 and 6, so that the coin pocket will then be in line with the coin slot $a$ to receive the coin $f'$ when introduced therein.

The cover plate $b$, as shown in Fig. 5, is curved at $b^6$ to permit of the rocking movement of the coin carriage $c$, the center for the curvature of the part $b^6$ being the center of the shaft $o$. At the back of the coin carriage $c$ is a curved plate $l$ supported by the coin carriage and the side plates $v$, the curvature of the plate $l$ being concentric with that of the curved part $b^6$ of the cover plate $b$, so that when the coin carriage moves from the position shown in Figs. 3, 5 and 6 to that shown in Fig. 4, the curved plate $l$ will move in a path concentric with that of the cover plate and close the coin slot $a$ when the coin pocket $l^5$ is out of line with it, thus preventing the introduction of a coin or coins into the machine until the coin carriage has again returned to a normal position.

The top edges of the side plates $v$ are correspondingly curved to the plate $l$, and the top edge of one of the side plates $v$ is provided with a segmental rack $d^5$ in front of the coin carriage, which meshes with a driving pinion $e$, and the driving pinion $e$ in turn meshes with the driven pinion $f$, loosely mounted on the feed roll $g$, the pinion $f$ being formed with a ratchet wheel $h$, and the feed roll $g$ being formed with a flange $i$, to which is pivoted a spring-tensioned pawl $j$ engaging with the teeth of the ratchet wheel $h$, whereby the feed roll will revolve unitedly with the pinion $f$ in a forward direction and permit of the revolution of the pinion $f$ independently of the feed roll, in the reverse direction.

When the coin carriage $c$ and its related parts, including the side plates $v$ are moved in the direction of arrow indicated in Fig. 5 of the drawings, the segmental rack $d^5$ causes the rotation of the pinions $e$ and $f$, and by means of the ratchet $h$ and pawl $j$ connection with the feed roll $g$, effects the revolution of the latter for the delivery of a predetermined quantity of paper $g^{10}$ from the paper roll $g^4$ through an opening $g^3$ in the front $g^5$ of the machine.

Fastened to the front of the machine above the opening $g^3$ is a paper cutter $g^6$ having a serrated edge $g^7$ opposed to the opening $g^3$ through which the paper is obliged to pass as it feeds from the machine. Immediately below the opening $g^3$ is a curved guard $g^8$ projecting beyond the front $g^5$ to prevent the paper being drawn downward in a plane parallel with the front $g^5$. The purpose of this construction is as follows:— The segmental rack $d^5$ at each forward movement of the coin carriage and its related parts, causes the rotation of the feed roll $g$ to deliver from the paper roll $g^4$ through the opening $g^3$, a pre-determined length of paper; the length of each feed of the paper being the same at each complete movement of the segmental rack.

The paper which has been fed through the opening $g^3$ is severed by the serrated edge $g^7$ of the paper cutter $g^6$ whenever the pull on the paper tends to draw it out of a plane parallel with the opening $g^3$, that is to say:—owing to the guard $g^8$ the paper cannot conveniently be drawn out of the machine in a plane parallel with the opening $g^3$ and therefore it must be drawn against the serrated edge of the paper cutter which immediately severs it and thus prevents or at least renders it difficult to waste, or rob the machine of, the paper.

The coin chute $d$ is provided with an arm $p^4$, secured to the inner surface of the front $g^5$ of the casing, which maintains the coin chute in its fixed relation to the other parts of the mechanism, and this arm $p^4$ is provided with a horizontal offset $s$ parallel with the mouth of the coin chute $d$ to be engaged by the spring-tensioned locking dog $t$, rockably mounted on a shaft $u$ journaled in the side plates $v$ of the coin carriage.

The locking dog $t$ is formed with a latch $w$ to engage with a keeper $x$ forming part of the arm $p^4$ when the coin carriage has been moved into the position shown in Fig. 4, the coin $f'$ then passing from the coin pocket $l^5$ into the coin chute $d$; the purpose of the latch $w$ and keeper $x$ being to retain the coin carriage and its related parts in this position until released as hereinafter described.

Fulcrumed on the shaft $o$, exteriorly to the adjacent side plate $v$, is a lever $y$ tensioned by a spring $z$, and connected to the lever $y$ is a bent arm $a'$ extending through an elongated slot $v^5$ in the adjacent side plate $v$. The inner end of the bent arm $a'$ operates through a slot $b'$ in the coin carriage $c$, and is opposed to the end $o'$ of the locking dog $t$, the normal position of the locking dog $t$ being that shown in Fig. 5 of the drawings so that it can clear the offset $s$ as the coin carriage $c$ and its related parts move to the position shown in Fig. 4.

The lever $y$ is free to turn for a limited distance on the shaft $o$ without imparting movement to the coin carriage $c$, unless a coin $f'$ as shown in Fig. 4, has been introduced therein. The operation of the lever when no coin has been introduced therein, brings the end of the bent arm $a'$ into engagement with the end $o'$ of the locking dog $t$, and rocking it on the shaft $u$, forces the shoulder $d'$ of the locking dog into engagement with the offset $s$, as shown in Fig. 6. This engagement of the locking dog and offset prevents the movement of the coin carriage and its related parts from the normal position shown in Fig. 5, and thus not only foils any attempt to waste or rob the machine of paper, but also prevents the operation of the air compressor hereinafter described.

When a coin $f'$ is introduced into the coin pocket $l^5$, the movement of the lever $y$ in the direction indicated by arrow in Fig. 4, brings the end of the bent arm $a'$ into engagement with the coin $f'$, the latter then preventing the end of the bent arm from coming into engagement with the end of the locking dog $t$. The arm $a'$ then bearing against the coin, presses the coin against the front wall of the coin pocket $l^5$ and moves the coin carriage in the direction indicated by arrow in Fig. 5 until the parts have attained the position shown in Fig. 4, this movement being arrested by the front wall of the coin carriage coming into engagement with the offset $s$. The latch $w$ then engages with the keeper $x$ and locks the coin carriage in its operated position until it is released as hereinafter described, the locking dog $t$, during this movement of the coin carriage remaining in the same relative position as that indicated in Fig. 5, until the latch $w$ engages with the keeper $x$.

As the coin carriage moves from the position shown in Figs. 3 and 5 to that shown in Fig. 4, the segmental rack $d^5$ meshing with the pinion $e$, causes the rotation of the pinion $f$ and effects the revolution of the feed roll $g$ to deliver a pre-determined length of paper from the paper roll. When the coin carriage attains the position shown in Fig. 4, the coin pocket $l^5$ comes into line with the coin chute $d$, and the coin $f'$ contained therein then passes from the coin pocket $l^5$ into the coin chute $d$, and descends through the latter until arrested by the stop $g'$.

As shown in Fig. 5 the stop $g'$ is located slightly below the plunger $h'$ and the collar $i^5$ on the valve stem $i'$. In the collar $i^5$ is a recess $i^6$ slightly greater in diameter than, and opposed to, the end of the plunger $h'$ to permit of the lengthwise movement of the plunger $h'$, without imparting motion to the valve stem $i'$ until the coin $f'$ has been arrested by the stop $g'$. The coin $f'$ when arrested by the stop $g'$ is in the path of the plunger $h'$, and the movement of the plunger $h'$ can then be imparted to the valve stem $i'$ as hereinafter described.

On the valve stem $i'$ is a valve $j'$ operating in the valve chamber $k'$. The valve chamber $k'$ is formed in a valve casing $l'$ fitted on the air duct $m'$, and in the valve casing $l'$ is an induction port $o'$ connecting the air duct $m'$ with the valve chamber $k'$. The valve casing $l'$ is provided with two eduction ports $p'$ and $q'$; the eduction port $p'$ connecting the valve chamber $k'$ with the eduction pipe $r'$, and the eduction port $q'$ connecting the valve chamber $k'$ with a hollow flexible blade $s'$.

When the air flowing from the air duct $m'$ through the induction port $o'$, valve chamber $k'$, and eduction port $q'$, into the flexible blade $s'$, attains a pre-determined pressure, as hereinafter described, it tends to straighten the flexible blade $s'$, and the free end of the latter then moves against the set screw $t'$ adjustable in the arm $u'$ of the rockable knife switch $v'$ to determine the pressure at which the knife switch is opened by the movement of the flexible blade $s'$, that is to say, the greater the distance the free end of the flexible blade has to travel, the greater the pressure it will take to move it to its operative position.

The knife switch $v'$ is rockably mounted on a shaft $w'$, and is provided with a depending arm $x'$ engaged by a spring-tensioned latch $y'$ when the knife switch is closed between the contact plates $z'$, the said latch $y'$ then holding the knife switch $v'$ in engagement with the contact plates $z'$ until released by the movement of the flexible blade $s'$.

Figures 1, 10:
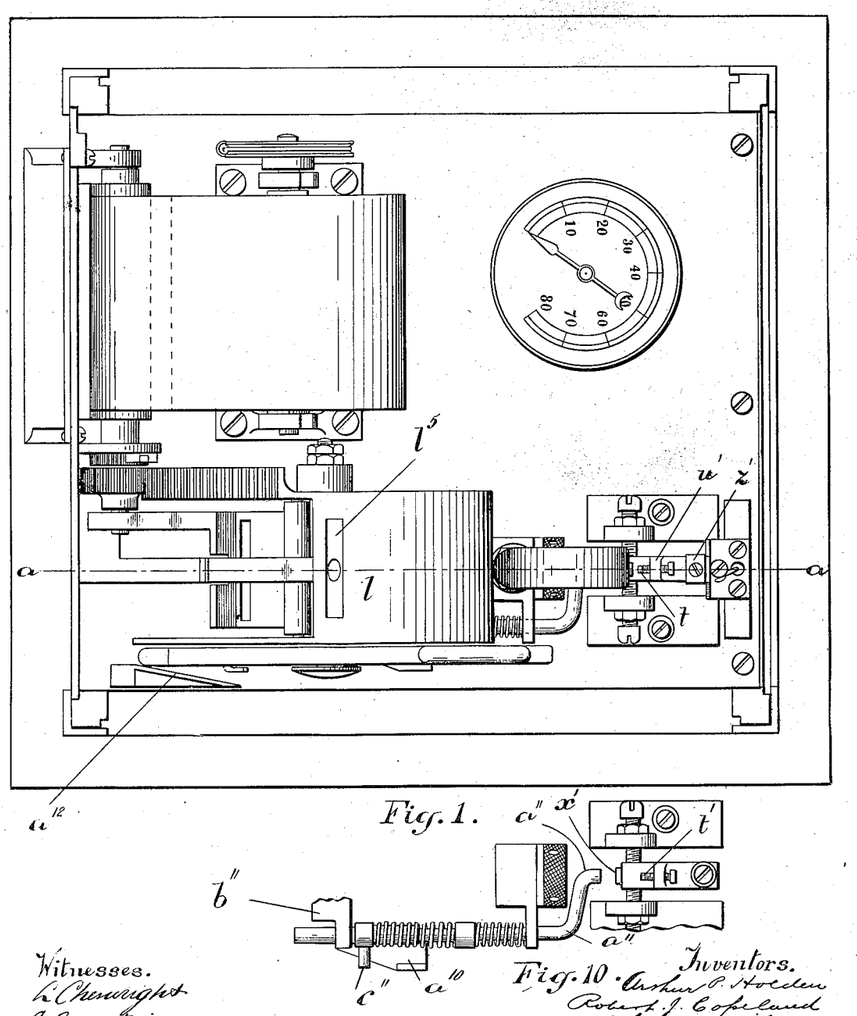
Figure 1, is a plan view of an air vending machine suitable for the cleaning of tobacco pipes.
Fig. 10, is a plan view of the switch-closing means; and, Fig. 11, is a sectional plan view on the line $b$—$b$ Fig. 5.

When the lever $y$ is moved from the position shown in Fig. 3 to that shown in Fig. 4, the hinged member $b''$ carried by the lever $y$ (see Figs. 4 and 10) engages a pin $c''$ projecting from the spring-tensioned push rod $a''$, and forces the push rod against the arm $x'$ moving it and the knife switch $v'$ from the position shown in Figs. 3 and 5 to that shown in Fig. 4.

In the position shown in Figs. 3 and 5, the knife switch $v'$ is clear of the contact plates $z'$, but in the position shown in Fig. 4, it is in engagement with them, and when the knife switch is in the position shown in Fig. 4 the latch $y'$ engages the arm $x'$ and locks the knife switch $v'$ in its closed position with relation to the contact plates $z'$. When the knife switch $v'$ moves into the position shown in Fig. 4, the set screw $t'$ engages the free end of the flexible blade $s'$, the latter then being in its normal position. A circuit for the current is then established from the plug $e''$ by means of the conductor $f''$, contact plates $z'$, knife switch $v'$, and its metal supports $v^4$, to the conductor $g''$, motor $d''$, and conductor $h''$ to the plug $e''$. During this circuit of the current, the motor $d''$ actuates the air compressor $h^3$, which forces the compressed air through the air duct $i''$ to the compressed air tank $j''$, from which the air passes by means of the air duct $m'$, and induction port $o'$ to the valve chamber $k'$, and from the valve chamber $k'$ through the eduction port $q'$, which is continuously open, to the hollow flexible blade $s'$.

When the air within the compressed air tank $j''$ has attained a pre-determined pressure, which is indicated on a gage $j^6$, connected with the compressed air tank $j''$ by an air duct $j^7$, it tends to straighten the blade $s'$, the free end of which then moves against the set screw $t'$, and the continued pressure of the compressed air in the flexible blade $s'$ and the straightening effect of the flexible blade $s'$, forces the arm $u'$ in the direction of the contact plates, and rocks the knife switch $v'$ on the shaft $w'$ until the knife switch is disengaged from the contact plates, thus opening the circuit of the current from the plug $e''$ to the motor, and stopping the action of the motor and the air compressor $h^3$. The paper which has been delivered during the movement of the coin carriage is then torn off and for sanitary reasons is placed over the stem of the tobacco pipe $r^7$ and this stem is then inserted in the entrance $k^5$ of the nicotin carriage $k$. The entrance $k^5$ is preferably made of soft rubber, having a substantially conical bore, the outer end of which is of greater dimension than the inner end, so that the mouthpiece of the pipe stem can be centered with the nicotin carriage $k$ and the nicotin retainer $k^4$, which it is usual to place in the carriage $k$, the nicotin retainer $k^4$ containing antiseptic material to receive and retain the nicotin blown into it.

Figure 2:
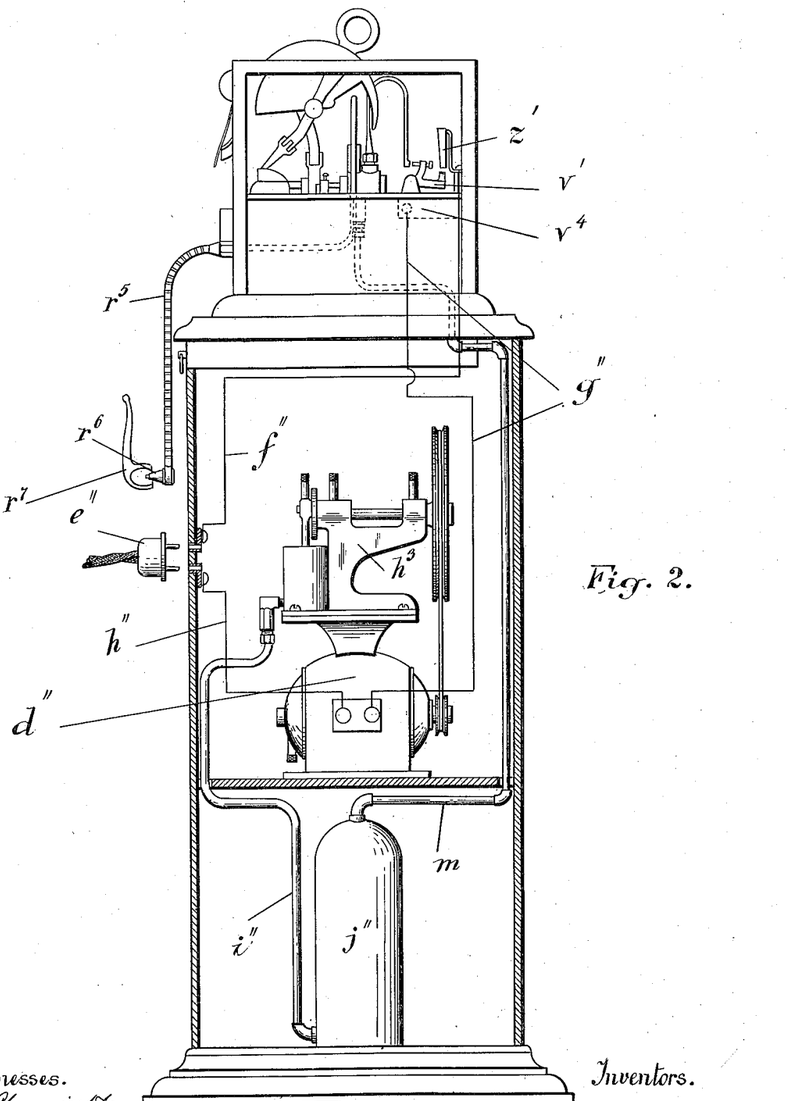
Fig. 2, is a side elevation of the machine shown in Fig. 1.

Connected with the eduction pipe $r'$ is a flexible tube $r^5$ (see Figs. 2 and 4) and this flexible tube has a nozzle $r^6$ to be inserted in the pipe bowl. When the carriage $k$ moves inward in the direction indicated by arrow in Fig. 8 it carries with it the arm $k^9$ connected with the plunger $h'$, and causes the inward movement of the plunger $h'$ against the coin $f'$ arrested by the stop $g'$, the coin imparting the movement of the plunger $h'$ to the collar $i^5$ and valve stem $i'$, and displacing the valve $j'$ from its valve seat, so that the compressed air can pass from the valve chamber $k'$ through the eduction port $p'$, eduction pipe $r'$, flexible tube $r^5$, nozzle $r^6$ and tobacco pipe $r^7$, and force the nicotin from the tobacco pipe into the nicotin retainer $k^4$.

Connected to the plunger $h'$ is an arm $k^8$ projecting in the direction of the keeper $x$. As the plunger $h'$ moves inward, the arm $k^8$ comes into contact with the end of the locking dog $t$, as shown in Fig. 4, and disengages the latch $w$ from the keeper $x$. When the latch $w$ is disengaged from the keeper $x$, the spring $r$ restores the coin carriage and its related parts from the position shown in Fig. 4 to that shown in Figs. 3 and 5.

The nicotin carriage $k$ is slidably mounted in bearing $l^8$, and the nicotin retainer $k^4$ is removably placed in the nicotin carriage $k$ being pressed against the flexible end $k^5$ by means of a spring $l^6$. Hinged at $k^{10}$ to the inner end of the nicotin carriage $k$ is a yielding arm $l^9$, which engages with a stop $l^7$ secured to the rear wall of the casing. The arm $l^9$, as the nicotin carriage $k$ moves inward, comes into contact with the stop $l^7$, and limits the inward movement of the carriage until sufficient force is applied to move it to its inward limit. The arm $l^9$, then yields laterally to clear the stop $l^7$ during the forcible inward movement of the carriage, and when the carriage returns from the limit of its inward movement the arm $l^9$, engaging with the inclined face of the stop $l^7$ swings vertically on its hinge and clears it. The object of this arm $l^9$ limiting the inward movement of the nicotin carriage, is to prevent a partial movement of the plunger $h'$ and valve stem $i'$ for a partial displacement of the valve $j'$ from its valve seat, so that a leakage of compressed air from the valve chamber $k'$ could occur through the eduction pipe $r'$, and by forcing the nicotin carriage to the limit of its inward movement, this object is not only attained, but a full and forcible delivery of compressed air is assured. The release of the compressed air originates through the movement of the nicotin carriage, by reason of the fact that the arm $k^9$ has a fixed connection $m^8$ with the plunger $h'$, and is pivoted at one end to the underside of the bed plate $m^9$, and is engaged at the other end by the set screws $o^9$ adjustable in the nicotin carriage $k$, the set screws $o^9$ providing for the radial movement of the arm $k^9$ during the lengthwise movement of the carriage, by reason of the fact that the arm $k^9$ has a sliding engagement with the set screws.

During the inward movement of the nicotin carriage $k$, the set screws engaging with the adjacent end of the arm $k^9$, causes the arm to move in a corresponding direction, and during the inward movement of the arm $k^9$ it moves, through its connection $m^8$, the plunger $h'$, and forces the plunger against the coin which has been arrested by the stop $g'$, and pressing the coin against the collar $i^5$ effects the movement of the valve stem $i'$, and forces the valve $j'$ from its seat to open the passage from the valve chamber $k'$ to the eduction port $p'$ and eduction pipe $r'$.

When the valve $j'$ is in its open position, the air can pass unobstructed from the compressed air tank through the pipe $m'$, induction port $o'$, valve chamber $k'$, eduction port $p'$, eduction pipe $r'$, to the flexible pipe $r^5$ and nozzle $r^6$ into the bowl of the tobacco pipe $r^7$, through the stem of which it forces the nicotin into the nicotin retainer, the pressure of the air passing through the pipe stem blowing a hole in the paper which has been wrapped around it. When the compressed air tank is emptied and the air ceases to pass through the pipe stem, the pressure of the pipe against the nicotin carriage is removed, and the nicotin carriage is then restored to its normal position by means of a spring $r^9$ bearing against the connection $m^8$ and a projecting part $r^8$ of the coin chute $d^8$.

The operation of the parts of the apparatus may be summarized as follows:—A coin $f'$ is introduced through the slot $a'$ into the coin chamber $l^5$ of the coin carriage $c$. The lever $y$ is then turned in the direction indicated by arrow in Fig. 4, bringing the arm $a'$ into engagement with the coin and pressing the coin against the front side of the coin pocket $l^5$, thus enabling the lever $y$ to move the coin carriage with it in the direction indicated by arrow until the forward movement of the coin carriage is arrested by the offset $s$. When the coin carriage is arrested by this offset, the coin pocket is in line with the coin chute $d$, and the coin descends from the coin pocket through the coin chute $d$ until arrested by the stop $g'$. Coincident with the arrest of the coin carriage, the latch $w$ engages with the keeper $x$ and locks the coin carriage and its related parts in their operated position. During the forward movement of the coin carriage, the rack $d^5$ causes the rotation of the pinions $e$ and $f$ and the revolution of the feed roll $g$ to deliver the paper $g^{10}$ through the opening in the front of the casing.

As the upper end of the lever $y$ moves forward in the direction indicated by arrow in Fig. 4, the opposite end moves rearward, and the hinged member $b''$ engages with the pin $c''$ and moves the spring-tensioned push rod $a''$ rearward into engagement with the arm $x'$ of the knife switch, oscillating the knife switch $v'$ on its shaft $w'$ until the knife switch enters between the contact plates $z'$, and closes the circuit of the current through the motor for the operation of the air compressor and the charging of the compressed air tank. When the hinged member $b''$ has moved the spring-tensioned push rod $a''$ to the limit of its movement, an inclined plate $a^{10}$ engages the hinged member $b''$ and throws it out of engagement with the pin $c''$, so that the lever can continue its movement with the coin carriage, without being arrested by the stoppage of the spring-tensioned push rod, and the push rod $a''$ can return instantaneously to its normal position when released by the hinged member $b''$.

When the compressed air tank is charged, the nicotin carriage is pressed inward, and during its inward movement it engages the arm $k^9$, which through its connection $m^8$ with the plunger $h'$ moves the plunger rearward into engagement with the coin $f'$ which has been arrested by the stop $g'$, and bearing against that coin, moves the valve stem $i'$ and displaces the valve $j'$ from its valve seat to open the ducts from the compressed air tank to the nozzle $r^6$.

Coincident with the inward movement of the plunger $h'$, the arm $k^8$ engages the latch $w$ and presses it away from the keeper $x$, so that the coin carriage and its related parts may return to their normal position, and with them the lever $y$. As the lever $y$ swings back to its normal position, the hinged member $b''$ comes into contact with another inclined, but oppositely arranged, surface $a^{12}$, which moves it back into line with the pin $c''$ to engage the latter on the next operation of the lever and coin carriage. When the pressure is removed from the nicotin carriage, the spring $r^9$ restores the nicotin carriage and the arm $k^9$ to their normal position, and the restoration of these parts, releases the pressure of the plunger $h'$ from the coin, which can then descend through the coin chute $d^8$ to the coin receptacle, the coin at that time being clear of the stop $g'$. When the coin has dropped below the collar $i^5$, the valve stem $i'$ and valve $j'$ return to their normal position under the influence of the spring $j^{12}$.

To momentarily detain the valve stem $i'$ in its operated position, a spring-tensioned locking detent $i^9$ is pivoted to the lower end of the coin chute $d$, and this detent $i^9$ has an arm $a^8$ engaged by a link $h^9$ carried by the plunger $h'$. During the initial movement of the plunger $h'$, that is to say:—during the movement of the plunger in the direction of the collar $i^5$, the link $h^9$ slides along the arm $a^8$ and the rocking detent is then pressed by the spring $h^8$ into a position where it will engage the inner end of the collar $i^5$, and through its engagement therewith, hold the valve stem $i'$ in its impressed position. During the outward movement of the plunger $h'$, that is to say:—the movement of the plunger away from the valve stem $i'$, the link $h^9$ travels along the arm $a^8$, and when it comes near the end of said arm, bears it down and releases the opposite end from its engagement with the collar $i^5$. This permits of a limited travel of the plunger $h'$ while the valve stem $i'$ is stationary, and permits the coin to descend into the coin chute $d$ before the valve stem starts its return to its initial position.

Figure 2A:
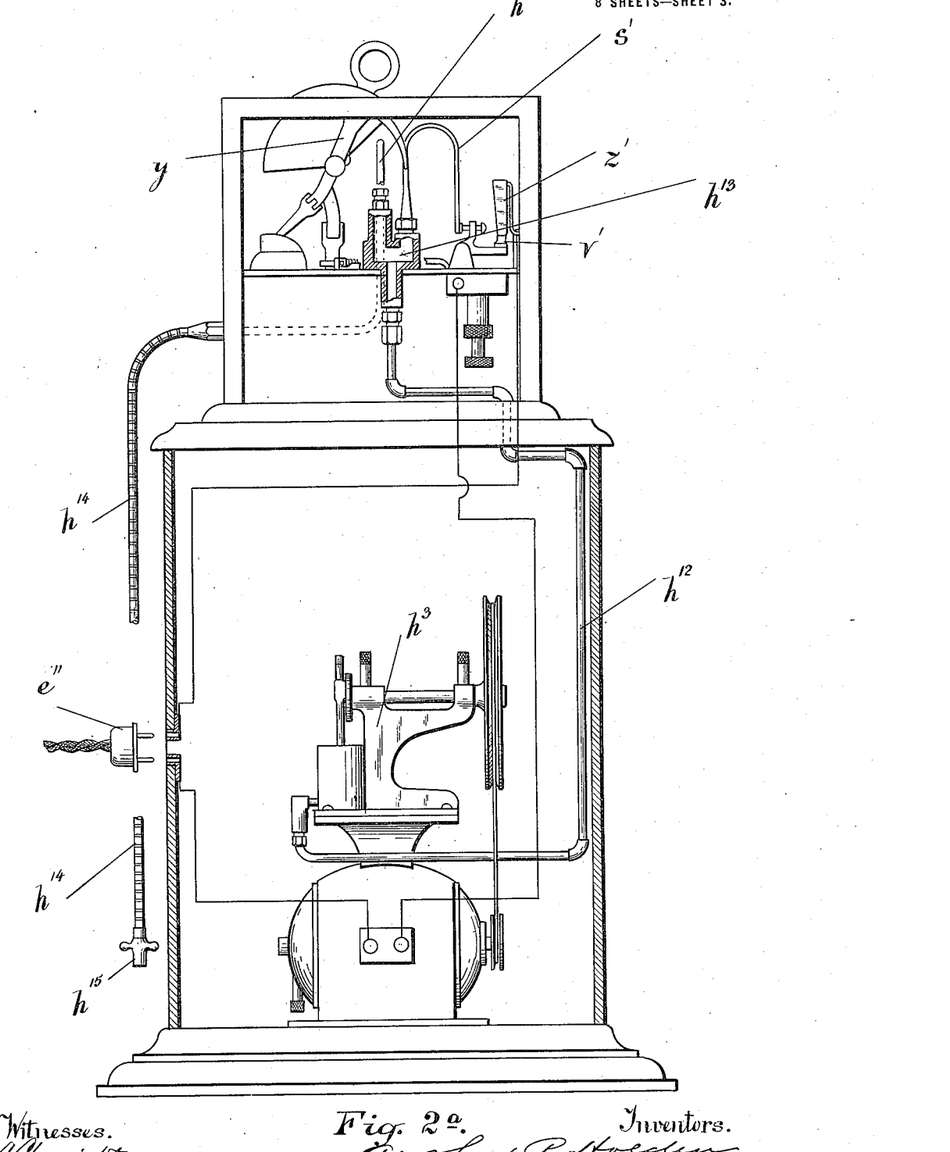

In Fig. 2$^a$, the machine is designed for the purpose of compressing air for the inflation of pneumatic tires and the like, and the general construction of the machine shown in this view is the same as that previously described, but in this construction it is not necessary to use the valve $j'$, valve stem $i'$, spring $j^{12}$, compressed air tank $j''$ and duct $i''$ shown in the other views.

In the construction shown in Fig. 2$^a$, the air is pumped from the air compressor $h^3$ through an air duct $h^{12}$ to an air chamber $h^{13}$, with which the flexible blade $s'$ is connected, and to which is also connected an education pipe $h^{14}$ having a nozzle $h^{15}$.

When the air compressor $h^3$ is operated, as previously described, the air flows through the duct $h^{12}$ into the chamber $h^{13}$, and from the chamber $h^{13}$ into the flexible blade $s'$, and also from the chamber $h^{13}$ through the eduction pipe $h^{14}$ to the inflatable tire, the pumping of the air being continued until it has attained a pre-determined pressure therein, when the air in the eduction pipe $h^{14}$, chamber $h^{13}$, and flexible blade $s'$, will force the flexible blade $s'$ against the set screw $t'$ and open the knife switch as previously described.

We have shown this construction for the inflation of pneumatic tires to demonstrate that it is possible to operate the flexible blade $s'$ through the back pressure of the air from the receptacle to which it is delivered without having to connect the flexible blade to a storage tank for the purpose of automatically stopping the operation of the apparatus.

Claims:

1. In a machine of the class described, an electric motor, an air compressor operated thereby, coin operated means controlling the electric circuit through said motor, consisting of a movably mounted coin carriage, means for preventing the movement of said coin carriage without the insertion of a coin, a lever movable with said coin carriage, a switch, closed by the movement of said lever whereby the electric circuit through the motor is completed, a storage tank for the compressed air connected with the air compressor, and a flexible member connected with said storage tank to open the electric circuit and thereby stop the operation of the motor when the air within the storage tank attains a pre-determined pressure.

2. In a machine of the class described comprising an electric motor, an air compressor, a switch for opening and closing the circuit through said motor, a coin controlled lever, a hinged member at the inner end of said lever, a spring-held member engaged by the hinged member, said spring-held member moving the switch to close the circuit through the motor, a storage tank connected with the air compressor, a flexible member connected with said storage tank adapted to move the switch and open the circuit through the motor, and means for locking the coin controlled mechanism against operation without the insertion of a coin.

3. In a machine of the class described comprising an electric motor, an air compressor operated thereby, a switch, a coin controlled lever operating said switch to close the circuit through said motor, a coin carriage movable with said lever, means for preventing movement of the coin carriage until a coin has been inserted therein, an air storage tank connected with the air compressor and means connected with the storage tank resiliently acting upon the switch to open the same when the compressed air in said tank attains a pre-determined pressure.

4. In a machine of the class described comprising an electric motor, an air compressor operated thereby, a switch, a lever, a coin carriage rockably mounted in said machine movable with said lever, a pivoted dog for locking said coin carriage and lever against movement without the insertion of a coin, a spring-held member with which the lever engages, said spring-held member being adapted to close said switch when the coin carriage is rocked, an air storage tank, resilient means connected with said storage tank movable under the influence of the air pressure created by the air compressor to move the switch into an open position thereby stopping the operation of the air compressor.

5. In a machine of the class described, an electric motor, an air compressor, a switch, a rockable coin carriage, a lever to move said coin carriage and close said switch for the operation of the motor and air compressor, an arm movable with said lever, a pivoted locking dog actuated by said arm if said lever is moved before a coin has been introduced into the coin carriage, a coin chute, an offset on said coin chute, a shoulder on said dog to engage therewith when the dog is pressed by said arm, a keeper to engage said dog when the coin carriage is rocked to the limit of movement, an air storage tank connected with the air compressor, and automatic means connected therewith for stopping the operation of the air compressor.

6. In a machine of the class described, an electric motor, an air compressor operated thereby, a switch for closing and opening the circuit through the motor, a rockable coin carriage, a lever for moving the same, a locking dog carried by said coin carriage, an arm movable with said lever adapted to operate said locking dog and prevent the movement of the coin carriage when a coin has not been introduced therein, means to engage with said locking dog when the carriage is rocked to the limit of motion and temporarily prevent its return to its normal position, an air storage tank connected with the air compressor and automatic means associated with said storage tank for stopping the operation of the air compressor, a valve controlling the delivery of the air and means for actuating the valve.

7. In a machine of the class described, an electric motor, an air compressor actuated thereby, a switch for opening and closing the circuit through the motor, a coin carriage, a lever actuating the coin carriage, means actuated by the lever to close the switch, an air storage tank, automatic means connected with the storage tank for opening said switch and stopping the motor, a valve controlling the air delivery and means for moving the air delivery valve to its open position.

8. In a machine of the class described, an electric motor, an air compressor, a switch, a rockable coin carriage, a locking dog carried thereby, a lever, an arm movable with the lever to operate said dog, a hinged member on the lever, a spring-held member engaged thereby to close the switch, an air storage tank, automatic means associated therewith to open the switch and stop the motor, an air delivery valve, and operable means for moving said valve to an open position comprising a plunger, a coin chute across which the plunger works transversely, means for arresting a coin adjacent to the end of said plunger, a valve stem for the air delivery valve against which the coin may be pressed by the plunger when opening the valve for delivering air from the machine.

9. In a machine of the class described, an electric motor, an air compressor, a switch, a coin carriage, a coin chute, a plunger working transversely across said coin chute, a valve, a stem for said valve opposed to end of said plunger, a collar on said stem having a recess therein coinciding with the end of said plunger, a stop in the coin chute for arresting a coin between the end of said plunger and said collar whereby the movement of said plunger will effect the movement of said valve stem and the consequent opening of the air delivery valve, an air storage tank and an automatic device connected therewith to effect the opening of the circuit through the electric motor.

10. A machine of the class described, an electric motor, an air compressor, a switch for opening and closing the circuit through the motor, a rockable coin carriage, a locking dog carried thereby, a keeper, said locking dog engaging with said keeper to retain the coin carriage in its rocked position, a lever, means actuated by the lever to close the switch when the coin carriage is rocked, an air storage tank, an automatic device connected therewith for opening said switch to stop the motor, an air delivery valve, and means to open the air delivery valve comprising a plunger, and an arm on said plunger for the purpose of releasing the locking dog from its keeper when the plunger is moved.

11. A machine of the class described, an electric motor, an air compressor, a switch, check-controlled means to effect the closing of the switch, an air storage tank, automatic means connected therewith for opening said switch, an air delivery valve, an air releasing carriage, a yielding arm hinged at the end of said air releasing carriage, a stop with which said yielding arm will resiliently engage, and means connected with the air releasing carriage whereby the sudden forcing of the yielding arm past the said stop will effect a sudden opening of the air delivery valve.

12. A machine of the class described, an electric motor, an air compressor, a switch, means to effect the closing of the switch, an air storage tank, automatic means connected therewith for opening said switch, an air delivery valve, an air releasing carriage, a yielding arm hinged at the end of said air releasing carriage, a stop with which said yielding arm will engage, an arm moved by said air releasing carriage, a movable plunger actuated by said arm, a coin chute across which the plunger works transversely, means for arresting a coin adjacent to the end of said plunger, a valve stem for the air delivery valve, and a collar on the end of said stem against which the coin may be pressed by the plunger, said valve stem operated upon the sudden forcing of the said yielding arm past said stop to effect the opening of the air delivery valve.

Toronto, June 1st, 1912.

ARTHUR PEART HOLDEN.
ROBERT JAMES COPELAND.

Signed in the presence of—
 EDWARD BERNSTEIN,
 C. H. RICHES.